(12) United States Patent
Yamanaka et al.

(10) Patent No.: US 11,982,215 B2
(45) Date of Patent: May 14, 2024

(54) EXHAUST DEVICE FOR INTERNAL COMBUSTION ENGINE

(71) Applicants: TOYOTA JIDOSHA KABUSHIKI KAISHA, Toyota (JP); AISIN TAKAOKA CO., LTD., Toyota (JP)

(72) Inventors: Noriyuki Yamanaka, Toyota (JP); Takahisa Koishikawa, Toyota (JP); Tomo Asano, Toyota (JP)

(73) Assignees: TOYOTA JIDOSHA KABUSHIKI KAISHA, Toyota (JP); AISIN TAKAOKA CO., LTD., Toyota (JP)

( * ) Notice: Subject to any disclaimer, the term of this patent is extended or adjusted under 35 U.S.C. 154(b) by 11 days.

(21) Appl. No.: 18/145,126

(22) Filed: Dec. 22, 2022

(65) Prior Publication Data

US 2023/0265775 A1 Aug. 24, 2023

(30) Foreign Application Priority Data

Feb. 22, 2022 (JP) .................................. 2022-025747

(51) Int. Cl.
*F01N 13/00* (2010.01)
*B01D 53/94* (2006.01)
(Continued)

(52) U.S. Cl.
CPC ....... *F01N 13/008* (2013.01); *B01D 53/9495* (2013.01); *F01N 3/28* (2013.01);
(Continued)

(58) Field of Classification Search
CPC .... F01N 13/008; F01N 13/0093; F01N 13/10; F01N 13/1805; F01N 3/28; F01N 3/02;
(Continued)

(56) References Cited

U.S. PATENT DOCUMENTS

2011/0126528 A1* 6/2011 Yamada ............. B01D 53/9468
60/299
2016/0084139 A1* 3/2016 Kato ..................... F01N 13/141
60/323

(Continued)

FOREIGN PATENT DOCUMENTS

JP 2009-257209 A 11/2009
JP 2009257209 A * 11/2009

*Primary Examiner* — Kenneth J Hansen
*Assistant Examiner* — Kelsey L Stanek
(74) *Attorney, Agent, or Firm* — Oblon, McClelland, Maier & Neustadt, L.L.P.

(57) ABSTRACT

An exhaust device for an internal combustion engine includes an exhaust manifold including branch pipe portions respectively connected to cylinders of the internal combustion engine in which exhaust strokes are executed at different timings, and a collecting pipe portion to which the branch pipe portions are collected and connected at a downstream side of the branch pipe portions, a catalyst provided at a downstream side of the collecting pipe portion in the exhaust manifold, an exhaust pipe provided at a downstream side of the catalyst, a sensor detecting a state of exhaust gas and provided in the exhaust pipe, and a connecting wall portion connecting the catalyst and the exhaust pipe and extending in a different direction with respect to a first central axis of the catalyst along a flow direction of the exhaust gas.

13 Claims, 7 Drawing Sheets

PRESENT EMBODIMENT

(51) Int. Cl.
*F01N 3/28* (2006.01)
*F01N 11/00* (2006.01)
*F01N 13/10* (2010.01)
*F01N 13/18* (2010.01)

(52) U.S. Cl.
CPC .......... *F01N 11/002* (2013.01); *F01N 11/007* (2013.01); *F01N 13/0093* (2014.06); *F01N 13/10* (2013.01); *F01N 13/1805* (2013.01); *F01N 2550/02* (2013.01)

(58) Field of Classification Search
CPC ..... F01N 3/08; F01N 3/24; F01N 3/36; F01N 11/002; F01N 11/007; F01N 2550/02; B01D 53/9495; B01D 53/94; F02D 41/04
USPC .......................................................... 60/299
See application file for complete search history.

(56) References Cited

U.S. PATENT DOCUMENTS

2017/0130631 A1* 5/2017 Woo ....................... F01N 13/107
2017/0260891 A1* 9/2017 Kuramashi ............. F01N 13/08
2019/0316510 A1* 10/2019 Kuramashi ............. B01D 53/94

* cited by examiner

PRESENT EMBODIMENT

COMPARATIVE EXAMPLE

United States Patent 11,982,215 B2

EXHAUST DEVICE FOR INTERNAL COMBUSTION ENGINE

CROSS-REFERENCE TO RELATED APPLICATION

This application is based upon and claims the benefit of priority of the prior Japanese Patent Application No. 2022-025747, filed on Feb. 22, 2022, the entire contents of which are incorporated herein by reference.

TECHNICAL FIELD

The present disclosure relates to an exhaust device for an internal combustion engine.

BACKGROUND

There is known an exhaust device for an internal combustion engine. The exhaust device is equipped with an exhaust manifold, a catalyst provided at the downstream side of the exhaust manifold, an exhaust pipe provided at the downstream side of the catalyst, and a sensor detecting a state of exhaust gas and provided in the exhaust pipe. In such an exhaust manifold, branch pipe portions respectively connected to cylinders of the internal combustion engine are collected and connected to a collecting pipe portion at the downstream side. Also, exhaust strokes are executed in these cylinders at different timings (see, for example, Japanese Unexamined Patent Application Publication No. 2009-257209).

A flow rate of the exhaust gas flowing through the exhaust pipe may be uneven in a cross section of the exhaust pipe due to a flow direction in which the exhaust gas flows into the exhaust pipe. Further, since the exhaust gas is discharged to different branch pipe portions at different timings for each cylinder, the exhaust gas from each cylinder flows into the exhaust pipe through different paths. Therefore, the unevenness of the flow rate of the exhaust gas in the cross section of the exhaust pipe described above also differ from each other for each cylinder. Thus, the flow rate of the exhaust gas that comes into contact with the sensor provided in the exhaust pipe also differs from each other for each cylinder, so that a detection result of the sensor might also vary for each cylinder.

Further, for such an exhaust device for the internal combustion engine, a pressure loss of the exhaust gas might increase. The increase in the pressure loss of the exhaust gas might cause an increase in a back pressure of the internal combustion engine, which might affect an output performance and fuel efficiency.

SUMMARY OF THE INVENTION

It is therefore an object of the present disclosure to provide an exhaust device for an internal combustion engine suppressing an increase in a pressure loss of exhaust gas and suppressing a variation in detection results of a sensor.

The above object is achieved by an exhaust device for an internal combustion engine including an exhaust manifold including branch pipe portions respectively connected to cylinders of the internal combustion engine in which exhaust strokes are executed at different timings, and a collecting pipe portion to which the branch pipe portions are collected and connected at a downstream side of the branch pipe portions; a catalyst provided at a downstream side of the collecting pipe portion in the exhaust manifold; an exhaust pipe provided at a downstream side of the catalyst; a sensor detecting a state of exhaust gas and provided in the exhaust pipe; and a connecting wall portion connecting the catalyst and the exhaust pipe and extending in a different direction with respect to a first central axis of the catalyst along a flow direction of the exhaust gas, wherein the connecting wall portion includes a first peripheral wall portion, and a second peripheral wall portion continuous downstream from the first peripheral wall portion, the first peripheral wall portion includes a first side wall portion intersecting the first central axis, the second peripheral wall portion includes a second side wall portion continuous downstream from the first side wall portion and overlapping a region in which the catalyst is projected downstream along the first central axis, and when the connecting wall portion is viewed in a direction perpendicular to a plane including the first central axis and a second central axis of an upstream end of the exhaust pipe connected to the connecting wall portion, the second side wall portion is inclined toward the first central axis, as compared with the first side wall portion.

An inner diameter of the first peripheral wall portion may decrease as the first peripheral wall portion extends downstream.

An inner diameter of the second peripheral wall portion may be smaller than an inner diameter of the first peripheral wall portion.

An inclination of the first side wall portion with respect to the first central axis may be 45 degrees or more and 85 degrees or less.

The first and second side wall portions may be inclined to a same side with respect to the first central axis.

The first and second side wall portions and the second central axis may be inclined to a same side with respect to the first central axis, and an inclination of the second central axis with respect to the first central axis may be greater than 0 degrees and may be equal to or smaller than an inclination of the first side wall portion with respect to the first central axis.

An inclination of the second central axis with respect to the first central axis may be the same as an inclination of the second side wall portion with respect to the first central axis.

The first side wall portion may be curved, when the connecting wall portion is viewed in the direction perpendicular to the plane.

The second side wall portion may be parallel to the first central axis.

The connecting wall portion may be a part of a case containing the catalyst.

The catalyst may be a first catalyst, a second catalyst may be provided at a downstream side in the exhaust pipe, and the sensor may be provided closer to the second catalyst than to the first catalyst.

The sensor may be a first sensor, and a second sensor detecting a state of exhaust gas may be provided at a downstream side of the second catalyst.

The sensor may include at least one of an air-fuel ratio sensor, an oxygen sensor, a temperature sensor, a carbon dioxide sensor, a NOx sensor, a PM sensor, a flow rate sensor, and a pressure sensor.

DETAILED DESCRIPTION

Configuration of Present Embodiment

Figure 1:
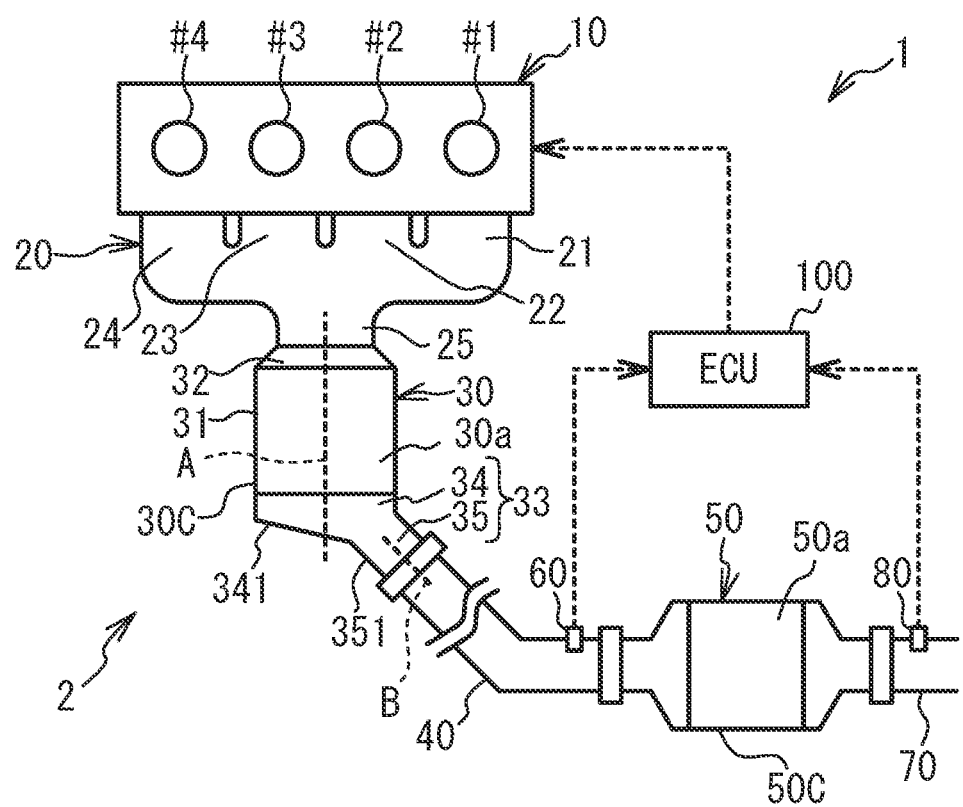
FIG. 1 is a schematically configurational view of an engine system according to a present embodiment.

FIG. 1 is a schematically configurational view of an engine system 1 according to a present embodiment. The engine system 1 includes an engine 10 and an exhaust device 2. The engine 10 is an example of an internal combustion engine, and is a compression ignition type diesel engine using light oil as a fuel. However, the engine is not limited thereto, and may be a spark ignition type gasoline engine using gasoline as a fuel. The engine 10 is a four-cycle engine that constitutes one combustion cycle with an intake stroke, a compression stroke, an expansion stroke, and an exhaust stroke. The engine 10 has four cylinders #1 to #4. The engine 10 is not limited to having four cylinders as long as it has plural cylinders. In the cylinders #1 to #4, the exhaust strokes are executed in the cylinders #1, #3, #4, and #2 in this order, that is, the exhaust strokes are executed at different timings. Each of the cylinders #1 to #4 is provided with an in-cylinder injection valve for injecting fuel into the cylinder, but the present disclosure is not limited thereto. For example, in addition to or instead of the in-cylinder injection valve, a port injection valve for injecting fuel to an intake port may be provided in each of the intake ports of the cylinders #1 to #4. An intake pipe is connected to the engine 10 via an intake manifold.

The exhaust device 2 includes an exhaust manifold 20, a catalytic converter 30, exhaust pipes 40 and 70, a catalytic converter 50, and air-fuel ratio sensors 60 and 80. The exhaust manifold 20 is connected to the engine 10, and the exhaust gas discharged from each of the cylinders #1 to #4 passes through the exhaust manifold 20.

Specifically, the exhaust manifold 20 includes branch pipe portions 21 to 24 respectively connected to the cylinders #1 to #4, and a collecting pipe portion 25 to which the branch pipe portions 21 to 24 are collected and connected at the downstream side. The catalytic converter 30 is connected to a downstream end of the collecting pipe portion 25 of the exhaust manifold 20. The exhaust pipe 40 is connected to a downstream end of the catalytic converter 30. The catalytic converter 50 is connected to a downstream end of the exhaust pipe 40.

The air-fuel ratio sensor 60 is provided in the exhaust pipe 40 and detects the air-fuel ratio of the exhaust gas having been passed through the catalytic converter 30. The air-fuel ratio sensor 60 is provided closer to the catalytic converter 50 than to the catalytic converter 30. The air-fuel ratio sensor 60 is an example of a sensor and a first sensor. The exhaust pipe 70 is connected to a downstream end of the catalytic converter 50. The air-fuel ratio sensor 80 is provided in the exhaust pipe 70 at the downstream side of the catalytic converter 50, and detects the air-fuel ratio of the exhaust gas having been passed through the catalytic converter 50. The sensor 80 is an example of a second sensor. The exhaust gas discharged from each of the cylinders #1 to #4 at different timings flows downstream from the collecting pipe portion 25 through the branch pipe portions 21 to 24 of the exhaust manifold 20.

The catalytic converter 30 houses a catalyst 30a in which an occlusion-reducing NOx catalyst is carried in a case 30C having a cylindrical shape. The catalytic converter 30 will be described later in detail. The catalytic converter 50 houses the catalyst 50a in which an oxidation catalyst is carried in a case 50C having a cylindrical shape. The catalysts 30a and 50a are each formed into a honeycomb shape along the flow direction of the exhaust gas. The catalysts 30a and 50a are examples of first and second catalysts, respectively.

The engine system 1 is provided with an electronic control unit (ECU) 100. The ECU 100 is an electronic control unit including a central processing unit (CPU), a read only memory (ROM), a random access memory (RAM), and a backup RAM. The ECU 100 is electrically connected to the air-fuel ratio sensors 60 and 80, and measured values of these sensors are inputted to. The ECU 100 controls the engine 10 based on the detection results of the air-fuel ratio sensors 60 and 80.

The case 30C of the catalytic converter 30 has a midstream wall portion 31, an upstream wall portion 32, and a downstream wall portion 33. The midstream wall portion 31 is continuous downstream from the upstream wall portion 32. The downstream wall portion 33 is continuous downstream from the midstream wall portion 31. The midstream wall portion 31 has a constant inner diameter in the downstream direction and holds the catalyst 30a. The inner diameter of the upstream wall portion 32 expands in the downstream direction. The exhaust manifold 20 is connected to an upstream end of the upstream wall portion 32. The inner diameter of the downstream wall portion 33 decreases in the downstream direction. The exhaust pipe 40 is connected to a downstream end of the downstream wall portion 33. The downstream wall portion 33 is an example of a connecting wall portion connecting the catalyst 30a and the exhaust pipe 40. FIG. 1 illustrates a central axis A of the catalyst 30a. The central axis A is a line segment that passes through the center of the cross section perpendicular to the flow path direction of the catalyst 30a provided in the midstream wall portion 31, and corresponds to a central axis along the flow direction of the exhaust gas. The catalyst 30a is formed into a honeycomb shape as described above, and specifically, the catalyst 30a is formed with flow paths extending from its upstream end surface to its downstream end surface. These flow paths extend along the central axis A. The downstream wall portion 33 will be described later in detail. Further, FIG. 1 illustrates a central axis B of the exhaust pipe 40 at the upstream end thereof connected to the downstream wall portion 33. The central axis B is a line segment that passes through a center of a cross section, at the upstream end of the exhaust pipe 40, perpendicular to the flow path direction. The central axes A and B are not parallel with each other.

Figure 2A:
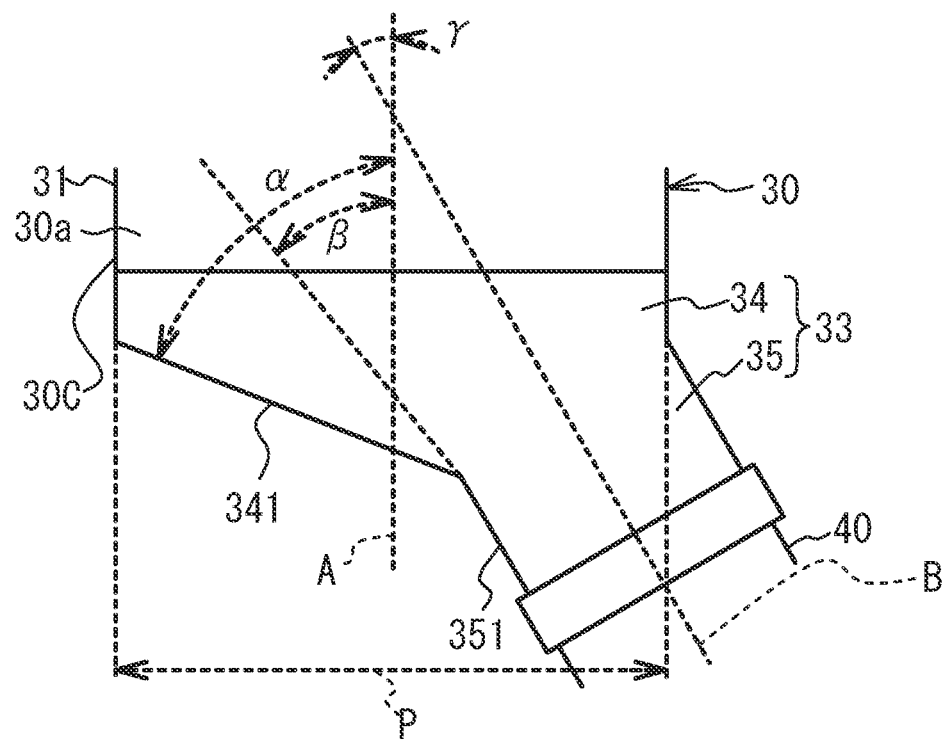
FIG. 2A is an enlarged view of a vicinity of a downstream wall portion of a catalytic converter case.

FIG. 2A is an enlarged view of a vicinity of the downstream wall portion 33 of the case 30C of the catalytic converter 30. FIG. 2A illustrates a vicinity of the downstream wall portion 33 viewed in a direction perpendicular to a plane including the central axes A and B. The downstream wall portion 33 extends in a direction different from the direction in which the central axis A extends. The downstream wall portion 33 includes peripheral wall portions 34 and 35. The peripheral wall portion 35 is continuous downstream from the peripheral wall portion 34. The peripheral wall portion 34 more decreases in an inner diameter as closer to the downstream side. An inner diameter of the peripheral wall portion 35 is substantially constant. In other words, the peripheral wall portion 34 has a funnel shape extending in a direction different from the direction in which the central axis A extends, and the peripheral wall portion 35 has a cylindrical shape also extending in a direction different from the direction in which the central axis A extends. The peripheral wall portions 34 and 35 are examples of first and second peripheral wall portions, respectively.

The peripheral wall portion 34 includes a side wall portion 341. The peripheral wall portion 35 includes a side wall portion 351 continuous downstream from the side wall portion 341. The central axis A intersects the side wall portion 341. The side wall portion 351 is away from the central axis A, but overlaps a projection region P on which the catalyst 30a is projected downstream along the central axis A. The side wall portion 341 also overlaps the projection region P. Both the side wall portions 341 and 351 are curved so that the inner surface is concave inward. The side wall portion 351 is provided so as to be inclined toward the central axis A, as compared with the side wall portion 341. That is, the side wall portion 351 is close to parallel to the central axis A, as compared with the side wall portion 341. The side wall portions 341 and 351 are inclined to the same side with respect to the central axis A. Specifically, the side wall portion 341 is inclined by an angle α with respect to the central axis A. The side wall portion 351 is inclined by an angle β with respect to the central axis A. Herein, the angle α is greater than the angle β, and the side wall portion 341 is more inclined with respect to the central axis A than the side wall portion 351. The central axis B is inclined to the same side as the side wall portions 341 and 351 with respect to the central axis A, and is inclined by an angle γ with respect to the central axis A. In the present embodiment, the angle γ is smaller than the angle α and is substantially the same as the angle β. The side wall portions 341 and 351 are examples of first and second side wall portions, respectively.

Figure 2B:
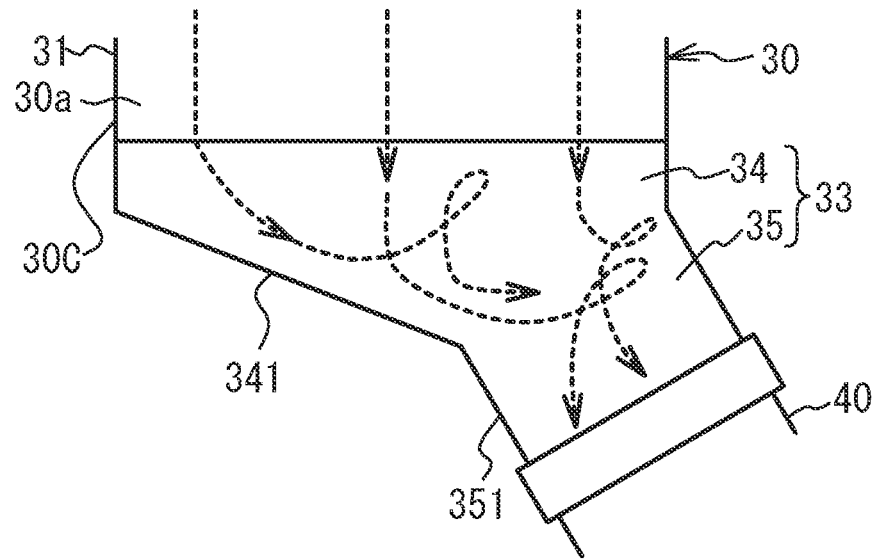
FIG. 2B is an explanatory view of an exhaust flow in the downstream wall portion of the catalytic converter case.

FIG. 2B is an explanatory view of the exhaust flow in the downstream wall portion 33 of the case 30C of the catalytic converter 30. As illustrated by the arrows in the figure, the exhaust gas flows in each flow path extending along the central axis A of the catalyst 30a. Therefore, the exhaust gas flows in the direction of the central axis A, immediately after passing through the catalyst 30a. A part of the exhaust gas having been passed through the catalyst 30a collides with the side wall portion 341 and swirls along the inner surface of the side wall portion 341. The swirled exhaust gas also promotes swirling of the exhaust gas that has passed through the catalyst 30a and does not collide with the side wall portion 341. Therefore, the exhaust gas flows downstream while swirling even in the exhaust pipe 40.

As described above, the side wall portion 341 is more inclined than the side wall portion 351 with respect to the central axis A. Further, the side wall portion 341 extends from a predetermined position on the outer peripheral portion of the midstream wall portion 31 to a position intersecting the central axis A. Herein, in general, a flow velocity of a fluid flowing in a circular pipe becomes higher as closer to a central axis of the circular pipe. Therefore, the flow velocity of the exhaust gas passing through the catalyst 30a also more increases as closer to the central axis A. It is therefore possible to permit most of the exhaust gas having been passed through the catalyst 30a to collide with the side wall portion 341. This makes it possible to promote the swirling of the exhaust gas. As will be described later in detail, the swirling of the exhaust gas in this way suppresses a variation in the detection results of the air-fuel ratio sensor 60.

Further, the peripheral wall portion 34 more decreases in the inner diameter as closer to the downstream side. Therefore, a swirling flow having a smaller radius is formed at the downstream side of the peripheral wall portion 34. This promotes the swirling of the exhaust gas. Further, the inner diameter of the peripheral wall portion is smaller than the inner diameter of the peripheral wall portion 34. This also makes it possible to maintain the small radius of the formed swirling flow and maintain the swirling speed of the exhaust gas. In the examples of FIGS. 2A and 2B, the inner diameter of the peripheral wall portion 35 is substantially constant. However, the inner diameter thereof is not limited to be constant, and the peripheral wall portion 35 may more decrease in the inner diameter as closer to the downstream side.

Further, the side wall portion 351 is not inclined as much as the side wall portion 341 with respect to the central axis A, but overlaps the projection region P. It is therefore possible to ensure the exhaust gas that flows without colliding with the side wall portion 341, among the exhaust gas having been passed through the catalyst 30a. For example, if all of the exhaust gas having been passed through the catalyst 30a collides with the side wall portion 341 and swirls, the pressure loss of the exhaust gas might increase. In the present embodiment, by providing the side wall portion 351 that is not significantly inclined with respect to the central axis A at a position overlapping the projection region P, it is possible to ensure the exhaust gas that does not collide with the side wall portion 341. This makes it possible to suppress an increase in the pressure loss of the exhaust gas. The entire side wall portion 351 may overlap the projection region P. When only a part of the side wall portion 351 overlaps the projection region P, the ratio of the side wall portion 341 to the projection region P is large, and the pressure loss of the exhaust gas might increase in this case.

If the angle α of the side wall portion 341 with respect to the central axis A is too small, the exhaust gas might not be swirled. Further, if the angle α is too large, the pressure loss of the exhaust gas might increase. Herein, it is assumed that an incident angle of the exhaust gas colliding with the side wall portion 341 parallel to the central axis A is equal to a reflection angle of the exhaust gas reflected by the side wall portion 341. A velocity component of the exhaust gas reflected by the side wall portion 341 is represented with a combination of a downstream component along a line segment illustrating the side wall portion 341 illustrated in FIG. 2A and a normal direction component to the line segment illustrating the side wall portion 341. When the angle α is 45 degrees or more, the magnitude of the normal direction component is equal to or greater than the magnitude of the downstream direction component. Herein, the magnitude of the normal direction component corresponds to the magnitude of the swirling speed of the exhaust gas swirling along the curved inner side surface of the side wall portion 341. As described above, the angle α may be 45 degrees or more in order to ensure the swirling speed. However, when the angle α is greater than 85 degrees, a flow rate of the exhaust gas flowing upstream along the line segment of the side wall portion 341 illustrated in FIG. 2A, among the flow rate of the exhaust gas colliding with the side wall portion 341 along the central axis A. This might increase the pressure loss of the exhaust gas. Therefore, the angle α may be 85 degrees or less.

The angle β is a value greater than 0 degrees. That is, the side wall portions 341 and 351 are inclined to the same side with respect to the central axis A. For example, when the angle β is 0 degrees and the side wall portion 351 is inclined to the opposite side of the side wall portion 341 with respect to the central axis A, the exhaust gas might be greatly separated near a boundary between the side wall portions 341 and 351, so that the pressure loss of the exhaust might increase.

As described above, the side wall portions 341 and 351 that promote the swirling of the exhaust gas and suppress the increase in the pressure loss of the exhaust gas are a part of the case 30C housing the catalyst 30a. Therefore, the parts are integrated, as compared with a case where a pipe having the side wall portion having the same function as the side wall portions 341 and 351 is provided separately from the case 30C. Further, since the side wall portions 341 and 351 are formed in a part of the case 30C, it is possible to swirl the exhaust gas in a position close to the catalyst 30a. This makes it possible to form a swirling flow of the exhaust gas, before the exhaust gas has passed through the catalyst 30a downstream so that the flow velocity might significantly decrease due to pressure loss or the like. It is thus possible to form a strong swirling flow.

The central axes A and B extend in different directions. For example, when the central axis lines A and B extend parallel in the same direction, the downstream wall portion 33 extends in a direction different from the central axis line A as described above. Therefore, the exhaust gas having flowed in the downstream wall portion 33 in a direction different from the central axis A collides with the inner wall of the exhaust pipe 40 extending along the central axis B parallel to the central axis A. This might increase the pressure loss of the exhaust gas. Since the central axis B is inclined to the same side as the side wall portions 341 and 351 with respect to the central axis A as in the present embodiment, the decrease in the swirling speed of the exhaust gas is suppressed in flowing into the exhaust pipe 40. Therefore, the angle γ may be greater than 0 degrees.

Further, the angle γ may be the angle α or less. For example, when the angle = is greater than the angle α, the inclination of the central axis B with respect to the central axis A, that is, the inclination of the exhaust pipe 40 with respect to the central axis A is greater than the inclination of the side wall portion 341 with respect to the central axis A. In this case, the exhaust pipe 40 is more inclined with respect to the central axis A than the side wall portion 351. Therefore, the exhaust gas flowing in the downstream wall portion 33 might collide with the inner wall of the exhaust pipe 40, and the pressure loss of the exhaust gas might increase. Thus, the angle γ may be the angle α or less.

As described above, in order to suppress the pressure loss of the exhaust gas, the angle γ may be greater than 0 degrees and equal to or smaller than the angle α. However, the angle γ may be substantially the same as the angle β. This makes it possible to sufficiently reduce the pressure loss when the exhaust gas flows into the exhaust pipe 40 from the peripheral wall portion 35.

Structure of Comparative Example

Figure 3:
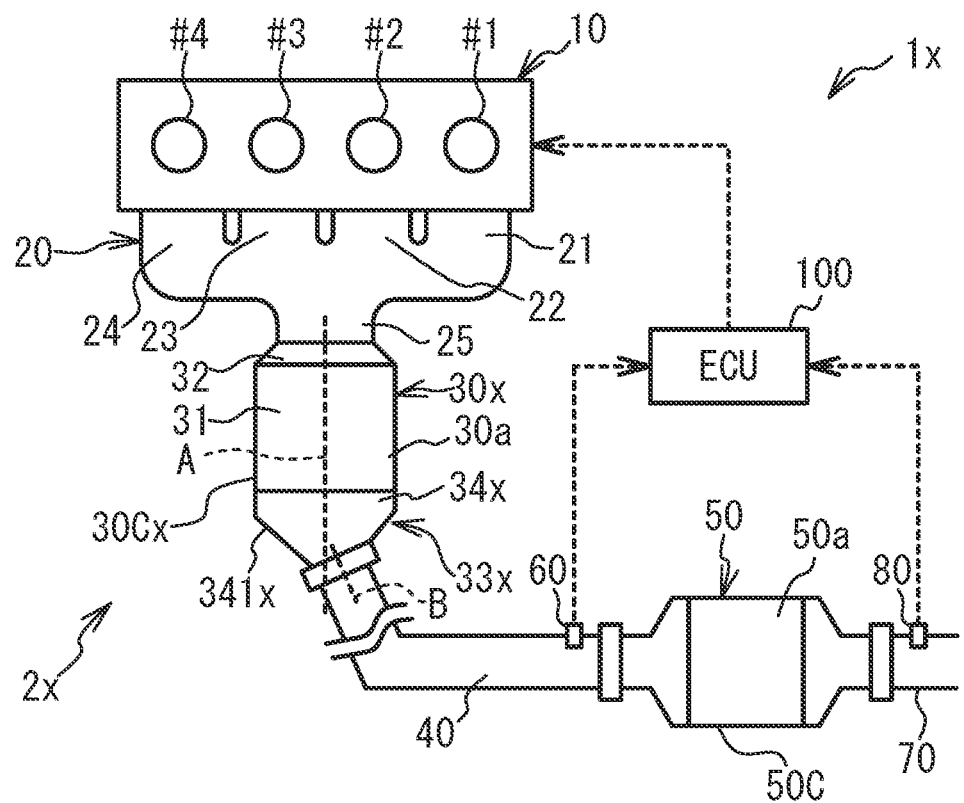
FIG. 3 is a schematically configurational view of an engine system according to a comparative example.
Figure 4A:
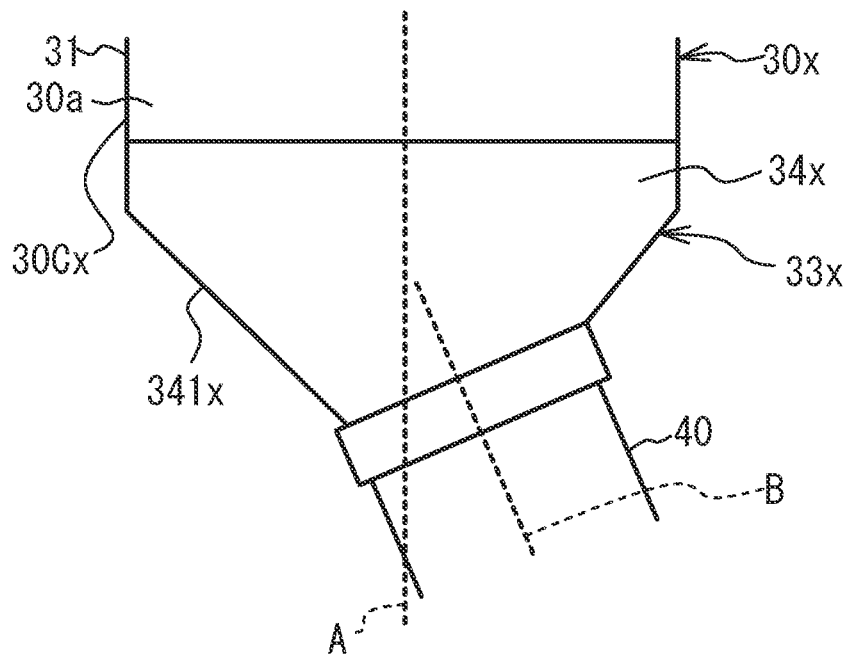
FIG. 4A is an enlarged view of a vicinity of a downstream wall portion of a catalytic converter case in the comparative example.
Figure 4B:
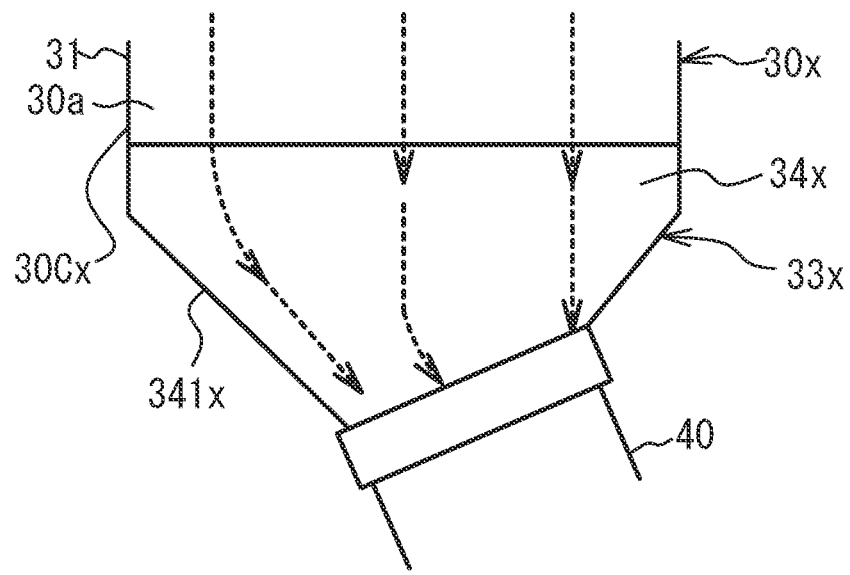
FIG. 4B is an explanatory view of an exhaust gas flowing in the downstream wall portion of the catalytic converter case in the comparative example.

FIG. 3 is a schematic configurational view of an engine system 1x according to a comparative example. The engine system 1x includes an exhaust device 2x. The exhaust device 2x includes a catalytic converter 30x. FIG. 4A is an enlarged view of a vicinity of a downstream wall portion 33x of a case 30Cx of the catalytic converter 30x in the comparative example. FIG. 4B is an explanatory view of the exhaust gas flowing in the downstream wall portion 33x of the case 30Cx of the catalytic converter 30x in the comparative example. FIGS. 3, 4A, and 4B correspond to FIGS. 1, 2A, and 2B, respectively. In the comparative example, the same components as those in the present embodiment are designated by the same reference numerals, and duplicate description will be omitted.

As illustrated in FIG. 4A, a side wall portion 341x of a peripheral wall portion 34x of the downstream wall portion 33x does not intersect the central axis A. Therefore, as illustrated in FIG. 4B, the exhaust gas having been passed through the catalyst 30a flows in the exhaust pipe 40 along the side wall portion 341x. As described above, in the comparative example, unlike the present embodiment, the exhaust gas is difficult to swirl.

[Difference in Exhaust Flow to Air-Fuel Ratio Sensor 60 Between Present Embodiment and Comparative Example]

Figure 5A:
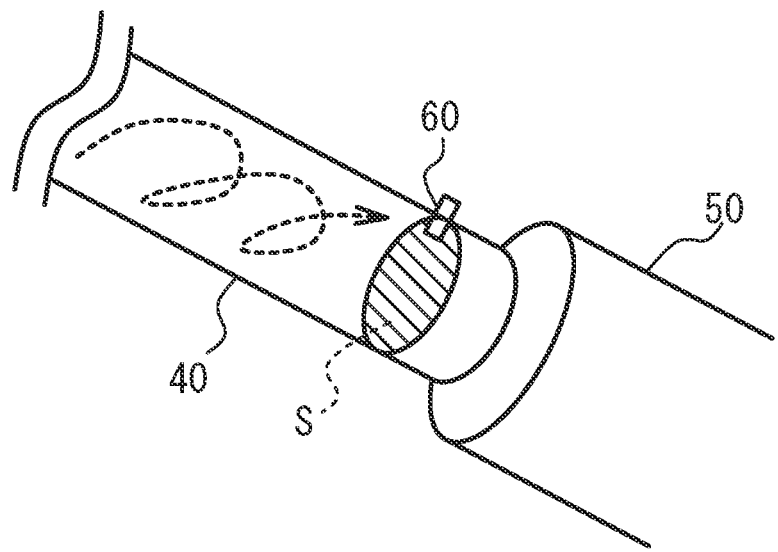
FIGS. 5A and 5B are explanatory views of the exhaust flow to an air-fuel ratio sensor in the present embodiment and the comparative example, respectively.
Figure 5B:
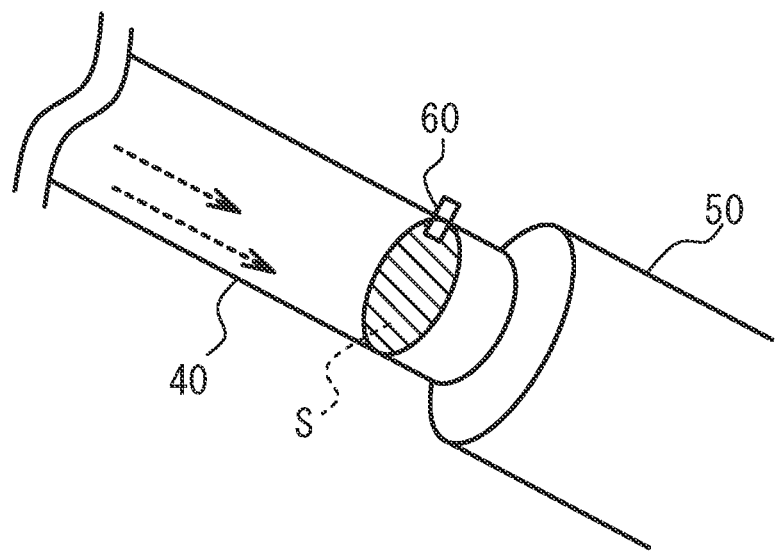

Next, a description will be given of a difference in the exhaust flow between the present embodiment and the comparative example. FIGS. 5A and 5B are explanatory views of the exhaust flow to the air-fuel ratio sensor 60 in the present embodiment and the comparative example, respectively. FIGS. 5A and 5B illustrate a cross section S orthogonal to the extending direction of the exhaust pipe 40 at the installation position of the air-fuel ratio sensor 60 by hatching. In the present embodiment, the exhaust gas of each of the cylinders #1 to #4 passes through the cross section S while swirling in the exhaust pipe 40. In the comparative example, the exhaust gas of the cylinders #1 to #4 flows substantially linearly in the exhaust pipe 40 and passes through the cross section S. Herein, in both the present embodiment and the comparative example, the exhaust gas discharged from the cylinders #1 to #4 flows through the branch pipe portions 21 to 24 and flows into the exhaust pipe 40, respectively. In the present embodiment, as described above, the exhaust gas having been passed through each of the branch pipe portions 21 to 24 swirls in the downstream wall portion 33 in the same manner and flows while swirling in the exhaust pipe portion 40. Therefore, in the present embodiment, the flow rate distribution in the cross section S of exhaust gas from each of the cylinders #1 to #4 is substantially even.

In the comparative example, the exhaust gas having been passed through each of the branch pipe portions 21 to 24 flows unevenly in the collecting pipe portion 25 and the catalytic converter 30x, which flows in the exhaust pipe 40 while maintaining such unevenness. For example, a large amount of the exhaust gas from the cylinder #1 flows from the branch pipe portion 21 through the collecting pipe portion 25 and the catalytic converter 30x along one side surface, and also flows in the exhaust pipe 40 along one side surface. On the other hand, the exhaust gas of the cylinder #4 flows from the branch pipe portion 24 through the collecting pipe portion 25 and the catalytic converter 30x along the other side surface, and also flows in the exhaust pipe 40 along the other side surface. In the comparative example in such a way, the flow rate distribution in the cross section S of exhaust gas from each of the cylinders #1 to #4 is uneven, and the flow rate distribution is also different for each of the cylinders #1 to #4.

Figure 6A:
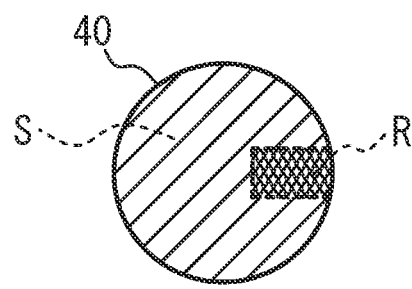
FIG. 6A is a view illustrating a sensing region corresponding to an installation position of the air-fuel ratio sensor in a cross section.
Figure 6B:
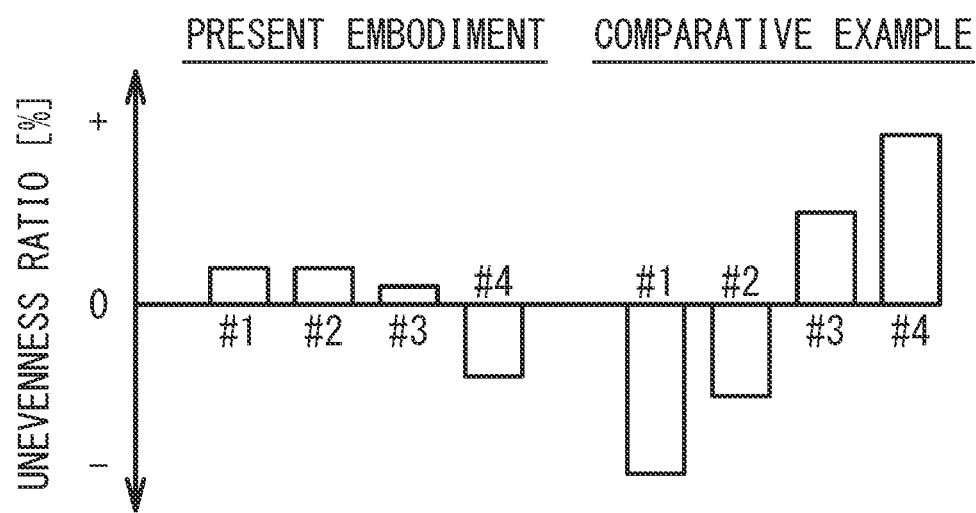
FIG. 6B is a graph of an unevenness ratio of each flow rate of the exhaust gas passing through the sensing region from cylinders #1 to #4 to an average value in the present embodiment and the comparative example.

FIG. 6A is a view illustrating a sensing region R corresponding to the installation position of the air-fuel ratio sensor 60 in the cross section S. FIG. 6B is a graph of an unevenness ratio of each flow rate of the exhaust gas passing through the sensing region R from cylinders #1 to #4 to an average value in the present embodiment and the comparative example. The average value in the present embodiment is an average value of the flow rates of the exhaust gas of the cylinders #1 to #4 passing through the sensing region R in the present embodiment. The average value in the comparative example is an average value of the flow rates of the exhaust gas of the cylinders #1 to #4 passing through the sensing region R in the comparative example. As illustrated in FIG. 6B, the difference in the unevenness ratio of the flow rates of the exhaust gas of the cylinders #1 to #4 passing through the sensing region R is large in the comparative example, but the difference is small in the present embodiment. This is because, as described above, the flow rate distribution in the cross section S is uneven in the comparative example, whereas the flow rate distribution in the cross section S is substantially even in the present embodiment. Therefore, the variation in the air-fuel ratio of the exhaust gas from each of the cylinders #1 to #4 detected by the air-fuel ratio sensor 60 is suppressed in the present embodiment, as compared with the comparative example.

In the present embodiment, as illustrated in FIG. 1, the air-fuel ratio sensor 60 is provided closer to the catalytic converter 50 than to the catalytic converter 30. That is, the distance from the downstream wall portion 33 to the air-fuel ratio sensor 60 is ensured. Therefore, the exhaust gas swirls sufficiently until reaching the air-fuel ratio sensor 60 from the downstream wall portion 33, which sufficiently mix the exhaust gas from each of the cylinders #1 to #4. This suppresses the variation in the air-fuel ratio of the exhaust gas from each of the cylinders #1 to #4 detected by the air-fuel ratio sensor 60.

Further, since the flow rate distribution at the installation position of the air-fuel ratio sensor 60 is even, the flow rate distribution at the installation position of the air-fuel ratio sensor 80 further downstream than the air-fuel ratio sensor 60 is also even. This also suppresses the variation in the air-fuel ratio of the exhaust gas from each of the cylinders #1 to #4 detected by the air-fuel ratio sensor 80.

[Variations]

Figure 7A:
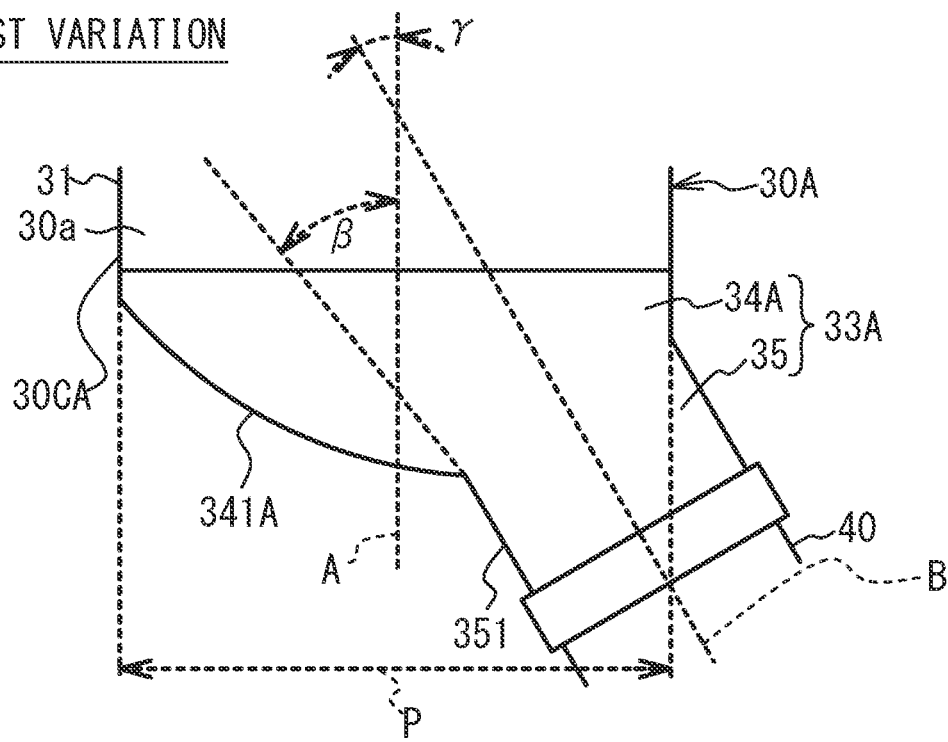
FIG. 7A is an enlarged view of a vicinity of a downstream wall portion of a catalytic converter case in a first variation.

Next, variation examples will be described. In the variation example, the same components as those in the above-described embodiment are designated by the same reference numerals, and duplicate description will be omitted. FIG. 7A is an enlarged view of a vicinity of a downstream wall portion 33A of a case 30CA of a catalytic converter 30A in a first variation. FIG. 7A corresponds to FIG. 2A. In the catalytic converter 30A, a side wall portion 341A is curved so as to be convex outward when a vicinity of the downstream wall portion 33A is viewed in the direction perpendicular to the plane including the central axes A and B. Specifically, when viewed in the direction perpendicular to the plane including the central axes A and B, a tangent line at any point on a ridgeline of the side wall portion 341A is inclined with respect to the central axis A, and an inclination of an arbitrary tangent line may gradually increase from the upstream side to the downstream side in the side wall portion 341A. As a result, it is possible to suppress an increase in the pressure loss of the exhaust gas while promoting the swirling of the exhaust gas collided with the side wall portion 341A. The maximum angle of inclination of the tangent line at an arbitrary point on the ridgeline of the side wall portion 341A with respect to the central axis A may be 90 degrees or less. Further, also in the first variation, the side wall portion 351 is provided so as to be inclined toward the central axis A with respect to the side wall portion 341A.

Figure 7B:
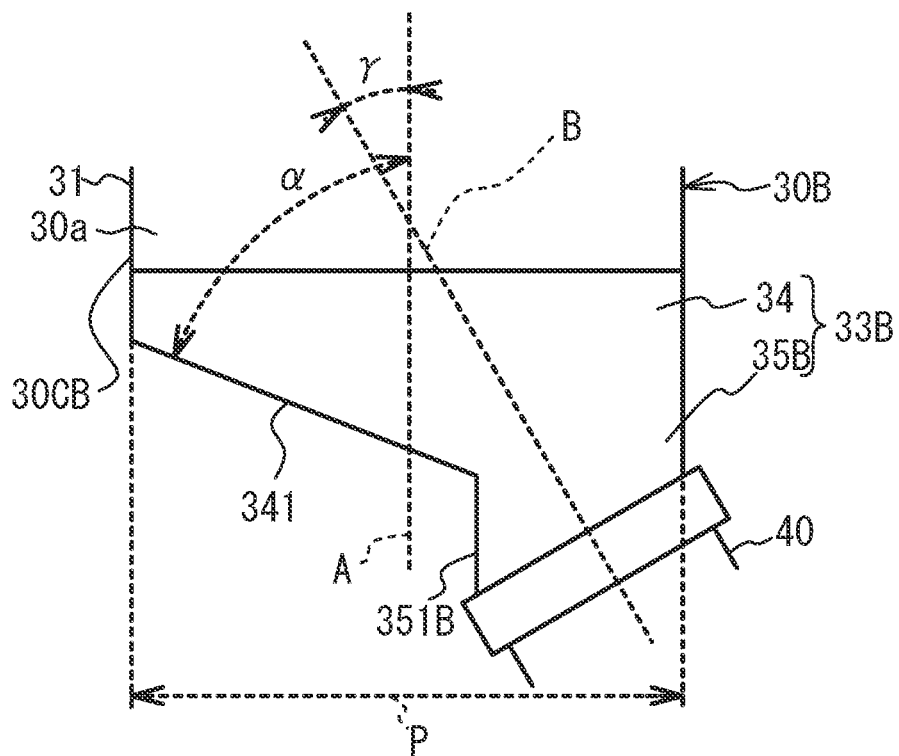
FIG. 7B is an enlarged view of a vicinity of a downstream wall portion of a catalytic converter case in a second variation.

FIG. 7B is an enlarged view of a vicinity of a downstream wall portion 33B of a case 30CB of a catalytic converter 30B of the second variation. FIG. 7B corresponds to FIG. 2A. In the catalytic converter 30B, a side wall portion 351B is parallel to the central axis A when a periphery of the downstream wall portion 33B is viewed in a direction perpendicular to the plane including the central axes A and B. In order to suppress the pressure loss of the exhaust gas, the side wall portion 351 may be inclined to the same side as the side wall portion 341 with respect to the central axis A like the present embodiment described above. However, at least the side wall portion 351B is parallel to the central axis A, the pressure loss of the exhaust gas is suppressed.

In the present embodiment described above, the air-fuel ratio sensors 60 and 80 detect the air-fuel ratio of the exhaust gas as the state of the exhaust gas, but the present disclosure is not limited thereto. For example, in addition to the air-fuel ratio sensors 60 and 80, or instead of at least one of the air-fuel ratio sensors 60 and 80, at least one of an oxygen sensor that detects a concentration of oxygen in the exhaust gas, a temperature sensor that detects a temperature of the exhaust gas, a carbon dioxide sensor that detects a concentration of carbon dioxide in the exhaust gas, a NOx sensor that detects a concentration of nitrogen oxide (NOx) in the exhaust gas, a PM sensor that detects a concentration of particulate matter (PM) in the exhaust gas, a flow rate sensor that detects a flow rate of the exhaust gas, and a pressure sensor that detects a pressure of the exhaust gas may be used. Further, these sensors are not limited to being installed in the sensing region R in the cross section S described above. The engine system 1 may be mounted on, for example, an engine vehicle or a hybrid vehicle.

Further, in the present embodiment described above, the catalyst 50a is provided on the downstream side of the catalyst 30a, but the present disclosure is not limited thereto. That is, an exhaust device may be provided in which the catalyst 50a is not provided and only the catalyst 30a is provided.

Although some embodiments of the present disclosure have been described in detail, the present disclosure is not limited to the specific embodiments but may be varied or changed within the scope of the present disclosure as claimed.

What is claimed is:

1. An exhaust device for an internal combustion engine, the exhaust device comprising:
    an exhaust manifold including
        branch pipe portions respectively connected to cylinders of the internal combustion engine in which exhaust strokes are executed at different timings, and
        a collecting pipe portion to which the branch pipe portions are collected and connected at a downstream side of the branch pipe portions;
    a catalyst provided at a downstream side of the collecting pipe portion in the exhaust manifold;
    an exhaust pipe provided at a downstream side of the catalyst;

a sensor detecting a state of exhaust gas and provided in the exhaust pipe; and a connecting wall portion connecting the catalyst and the exhaust pipe and extending in a different direction with respect to a first central axis of the catalyst along a flow direction of the exhaust gas, wherein the connecting wall portion includes a first peripheral wall portion, and a second peripheral wall portion continuous downstream from the first peripheral wall portion, the first peripheral wall portion includes a first side wall portion intersecting the first central axis, the second peripheral wall portion includes a second side wall portion continuous downstream from the first side wall portion and overlapping a region in which the catalyst is projected downstream along the first central axis, when the connecting wall portion is viewed in a direction perpendicular to a plane including the first central axis and a second central axis of an upstream end of the exhaust pipe connected to the connecting wall portion, the second side wall portion is inclined toward the first central axis, as compared with the first side wall portion, and the first peripheral wall portion has a funnel shape extending in the different direction with respect to the first central axis.

2. The exhaust device for the internal combustion engine according to claim 1, wherein an inner diameter of the first peripheral wall portion decreases as the first peripheral wall portion extends downstream.

3. The exhaust device for the internal combustion engine according to claim 1, wherein an inner diameter of the second peripheral wall portion is smaller than an inner diameter of the first peripheral wall portion.

4. The exhaust device for the internal combustion engine according to claim 1, wherein an inclination of the first side wall portion with respect to the first central axis is 45 degrees or more and 85 degrees or less.

5. The exhaust device for the internal combustion engine according to claim 1, wherein the first and second side wall portions are inclined to a same side with respect to the first central axis.

6. The exhaust device for the internal combustion engine according to claim 1, wherein the first and second side wall portions and the second central axis are inclined to a same side with respect to the first central axis, and an inclination of the second central axis with respect to the first central axis is greater than 0 degrees and is equal to or smaller than an inclination of the first side wall portion with respect to the first central axis.

7. The exhaust device for the internal combustion engine according to claim 1, wherein an inclination of the second central axis with respect to the first central axis is the same as an inclination of the second side wall portion with respect to the first central axis.

8. The exhaust device for the internal combustion engine according to claim 1, wherein the first side wall portion is curved, when the connecting wall portion is viewed in the direction perpendicular to the plane.

9. The exhaust device for the internal combustion engine according to claim 1, wherein the second side wall portion is parallel to the first central axis.

10. The exhaust device for the internal combustion engine according to claim 1, wherein the connecting wall portion is a part of a case containing the catalyst.

11. The exhaust device for the internal combustion engine according to claim 1, wherein the catalyst is a first catalyst, a second catalyst is provided at a downstream side in the exhaust pipe, and the sensor is provided closer to the second catalyst than to the first catalyst.

12. The exhaust device for the internal combustion engine according to claim 11, wherein the sensor is a first sensor, and a second sensor detecting a state of exhaust gas is provided at a downstream side of the second catalyst.

13. The exhaust device for the internal combustion engine according to claim 1, wherein the sensor includes at least one of an air-fuel ratio sensor, an oxygen sensor, a temperature sensor, a carbon dioxide sensor, a NOx sensor, a PM sensor, a flow rate sensor, and a pressure sensor.

* * * * *